United States Patent
Kim

(10) Patent No.: US 8,340,161 B2
(45) Date of Patent: Dec. 25, 2012

(54) METHOD OF DATA BLOCK TRANSMITTING

(75) Inventor: Yong Ho Kim, Gyeonggi-do (KR)

(73) Assignee: LG Electronics, Seoul (KR)

( * ) Notice: Subject to any disclaimer, the term of this patent is extended or adjusted under 35 U.S.C. 154(b) by 312 days.

(21) Appl. No.: 12/741,163

(22) PCT Filed: Nov. 10, 2008

(86) PCT No.: PCT/KR2008/006611
§ 371 (c)(1),
(2), (4) Date: May 3, 2010

(87) PCT Pub. No.: WO2009/072751
PCT Pub. Date: Jun. 11, 2009

(65) Prior Publication Data
US 2010/0260241 A1    Oct. 14, 2010

(30) Foreign Application Priority Data
Dec. 5, 2007    (KR) .......................... 10-2007-0125735

(51) Int. Cl.
*H04L 27/00*    (2006.01)

(52) U.S. Cl. ........................................ 375/219; 375/259
(58) Field of Classification Search .................. 375/219, 375/259
See application file for complete search history.

(56) References Cited

U.S. PATENT DOCUMENTS

| 5,886,652 | A   | *  | 3/1999  | Adachi et al. ............... 341/67 |
| 2003/0109221 | A1 | * | 6/2003  | You et al. ..................... 455/13.4 |
| 2004/0247033 | A1 |   | 12/2004 | Cho et al. |
| 2005/0055387 | A1 | * | 3/2005  | Kuekes et al. ............... 708/1 |
| 2008/0076432 | A1 | * | 3/2008  | Senarath et al. ............. 455/442 |

FOREIGN PATENT DOCUMENTS

KR    10-2004-0058638 A    7/2004

* cited by examiner

*Primary Examiner* — Shuwang Liu
*Assistant Examiner* — Michael Neff
(74) *Attorney, Agent, or Firm* — Birch, Stewart, Kolasch & Birch, LLP

(57) ABSTRACT

A method of transmitting data to guarantee reliability and, more particularly, a method of efficiently transmitting data by adjusting the size of data blocks according to a channel environment are provided. The method includes dividing input data into a plurality of blocks and generating one or more block sets using the plurality of blocks, coding a first block set of the one or more block sets and transmitting a predetermined number of coded blocks in the first coded block set to a receiver, receiving a signal indicating the state of a channel environment from the receiver, and packing a more increased or decreased number of coded blocks than the predetermined number of coded blocks according to the signal and transmitting the coded blocks to the receiver. By this configuration, it is possible to efficiently adjust a block error rate by adaptively increasing or decreasing the size of blocks according to the channel environment.

10 Claims, 5 Drawing Sheets

METHOD OF DATA BLOCK TRANSMITTING

TECHNICAL FIELD

The present invention relates to a method of transmitting data to guarantee reliability in a radio access system, and more particularly, to a method of efficiently transmitting data by adjusting the size of data blocks according to a channel environment.

BACKGROUND ART

In a general technique, coding indicates conversion of a signal into a sequence of specific codes. In addition, the coding includes a process (e.g., source coding) of converting source information into a binary code and a converting process (e.g., channel coding) of reducing an error in a process of processing and transmitting the code.

The source coding performs a function for reducing the amount of data obtained by the coding result and the amount of transmitted data by efficiently eliminating the duplication of a signal. The source coding may be divided into video coding and audio coding according to the form of information and may be divided into a lossless compression scheme and a loss compression scheme according to the existence/nonexistence of the loss of original data.

The channel coding is used for allowing a receiver to restore an original signal although distortion or loss occurs when a signal passes through a channel. That is, the channel coding is a coding scheme for reducing an error in a transmission path.

The channel coding includes an error detecting method of allowing a receiver to detect whether or not an error occurs during data transmission and an error correcting method of including a sufficient redundancy in a transmitted data block so as to allow a receiver to deduce a transmitted character.

The block coding indicates channel coding scheme of packing data in a predetermined block unit and performing coding and decoding. That is, the block coding is a scheme of dividing data bits by a predetermined block length, adding parity bits to the data bits, and transmitting the bits. A receiver may compare the data blocks and the parity bits, detect an error, and correct the error.

Generally, the block coding scheme is widely used. At this time, generally, if the size of the block is large, a block error rate may be increased, but overhead of control information such as header information added for transmission of the block is decreased. In contrast, if the size of the block is small, the block error rate may be decreased, but overhead of the control information such as the header information may be increased.

In a technique used generally, since a fixed block size is used regardless of a channel environment, a block error rate cannot be dynamically adjusted according to the channel environment.

DISCLOSURE

Technical Problem

An object of the present invention devised to solve the problem lies on an efficient data communication method.

Another object of the present invention devised to solve the problem lies on a method of dynamically adjusting a block error rate according to a channel environment.

Another object of the present invention devised to solve the problem lies on a method of adaptively increasing or decreasing the size of blocks according to a channel environment.

Another object of the present invention devised to solve the problem lies on a method of adjusting the size of a whole block by increasing or decreasing the number of blocks according to a channel environment.

Technical Solution

The object of the present invention can be achieved by providing a method of transmitting data in a radio access system, the method including: dividing input data into a plurality of blocks and generating one or more block sets using the plurality of blocks; coding a first block set of the one or more block sets and transmitting a predetermined number of coded blocks in the first coded block set to a receiver; receiving a signal indicating the state of a channel environment from the receiver; and packing a more increased or decreased number of coded blocks than the predetermined number of coded blocks according to the signal and transmitting the coded blocks to the receiver.

In this method, if the signal indicates that the channel environment is good, a second block set of the one or more block sets may be coded, and a coded block may be borrowed from the second coded block set, the more increased number of coded blocks than the predetermined number of coded blocks may be packed, and the packed blocks may be transmitted to the receiver. At this time, random coefficients used for coding the first block set and the second block set may be identical to each other.

In this method, if the signal indicates that the channel environment is good, the more increased number of coded blocks than the predetermined number of coded blocks may be selected from the first coded block set and are packed, and the packed coded blocks may be transmitted. At this time, random coefficients used for coding the more increased number of coded blocks than the predetermined number of coded blocks may be mutually independent.

In this method, if the signal indicates that the channel environment is bad, the more decreased number of coded blocks than the predetermined number of coded blocks may be packed and the packed coded blocks may be transmitted to the receiver.

In this method, the one or more coded block sets may be generated by coding the one or more block sets by a transmitter, and the coded blocks included in the one or more coded block sets may be mutually independent.

In this method, a random linear coding (RLC) method may be used as a method of coding the one or more block sets.

In this method, the predetermined number of coded blocks may further include information about coefficients for coding the one or more block sets. The information about the coefficients may be one of a matrix configured by the coefficients, a seed for generating the coefficients or indexes indicating the coefficients.

In another aspect of the present invention, provided herein is a method of transmitting data in a radio access system, the method including: receiving a predetermined number of coded blocks from a transmitter; transmitting a signal indicating the state of a channel environment to the transmitter; and receiving a more increased or decreased number of decoded blocks than the predetermined number of coded blocks from the transmitter according to the signal.

Advantageous Effects

The embodiments of the present invention have the following effects.

By employing the embodiments of the present invention, it is possible to perform efficient data communication. In addition, it is possible to dynamically adjust a block error rate according to a channel environment so as to improve a data communication throughput. In addition, it is possible to adaptively increase or decrease the size of blocks according to the channel environment so as to adjust the block error rate. In addition, it is possible to adjust the size of a whole block by a method of increasing or decreasing the number of blocks according to the channel environment. Accordingly, it is possible to improve a data throughput and perform communication with high reliability and efficiency by increasing or decreasing the size of the whole block according to the channel environment.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
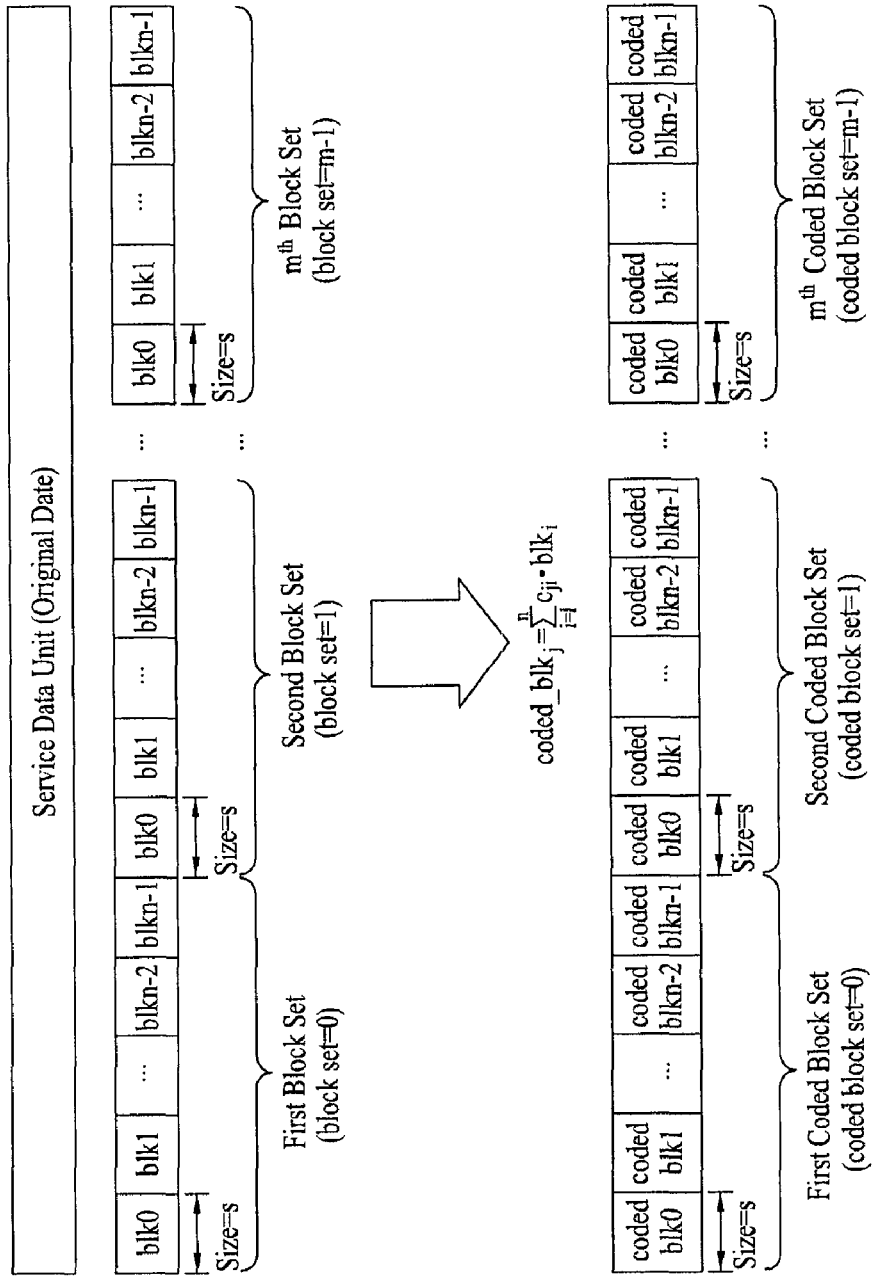
FIG. 1 is a view showing a process of coding data block sets using a random linear coding (RLC) method according to an embodiment of the present invention.

In order to solve the above-described problems, the embodiments of the present invention disclose various methods of transmitting data to guarantee reliability. In addition, the embodiments of the present invention disclose methods of efficiently transmitting a data block according to a channel environment.

The following embodiments are applicable to a wideband radio access system. The invention is not limited to terms representing details described herein and is applicable to a wired system as well as a wireless system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The above-mentioned embodiments of the present invention are disclosed on the basis of a data communication relationship between a base station and a mobile station. In this case, the base station is used as a terminal node of a network via which the base station can directly communicate with the mobile station. Specific operations to be conducted by the base station in the present invention may also be conducted by an upper node of the base station as necessary.

In other words, it will be obvious to those skilled in the art that various operations for enabling the base station to communicate with the mobile station in a network composed of several network nodes including the base station will be conducted by the base station or other network nodes other than the base station. The term "Base Station" may be replaced with a fixed station, Node-B, eNode-B (eNB), or an access point as necessary. The term "mobile station (MS)" may also be replaced with a user equipment (UE), a mobile terminal or a mobile subscriber station (MSS) as necessary.

The following embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The embodiments of the present invention can be supported by the standard documents disclosed in at least one of radio access systems such as the IEEE 802 system, the 3GPP system, the 3GPP LTE system and the 3GPP2 system. That is, the steps or the portions of the embodiments of the present invention which are not described in order to clarify the technical spirit of the invention can be supported by the above documents. In addition, all terms disclosed in the present specification are described by the above standard documents. In particular, the embodiments of the present invention can be supported by at least one of the standard documents of the IEEE 802.16 system, such as the P802.16-2004, P802.16e-2005 and P802.16Rev2 documents.

It should be noted that specific terms disclosed in the present invention are proposed for the convenience of description and better understanding of the present invention, and the use of these specific terms may be changed to another format within the technical scope or spirit of the present invention.

In the embodiments of the present invention, data can be coded using a random linear coding (RLC) method. The RLC method is one of block coding methods.

The RLC method is characterized in that coded blocks may include information about all blocks included in an original block set. Accordingly, although a portion of coded blocks is lost during transmission or reception, data can be rapidly restored by receiving other RLC blocks without receiving the coded blocks again. The RLC method only defines a data processing method of the present invention and the term representing the method may be variously modified.

FIG. 1 is a view showing a process of coding data block sets using an RLC method according to an embodiment of the present invention.

Referring to FIG. 1, original data indicates a service data unit (SDU) transmitted from an upper layer of a transmitter. The transmitter may divide the original data into small blocks (or packets). The transmitter may pack the divided blocks by any number (n) so as to configure a block set (or a segment).

At this time, the number n of block sets may be decided by a channel environment of a communication network, performance information of a transmitter and a receiver, and requirement of an application program. In addition, the transmitter may configure a total of m original block sets.

The transmitter generates a random coefficient matrix $C_{ji}$ for coding the divided data blocks. The transmitter may code the divided data blocks using the generated random coefficient matrix $C_{ji}$ according to a predetermined rule.

The transmitter may perform coding using the RLC method in the unit of block sets (e.g., n selected blocks). At this time, a set of n coded blocks may be called a coded block set. The receiver may perform decoding when the selected number n of coded blocks is received.

The coded blocks generated by the RLC method may include information about all the blocks included in the original block set. Accordingly, in order to restore a series of information blocks from the coded blocks received by the receiver, the n coded blocks and random coefficients used when the blocks are coded are necessary.

The transmitter generates new random coefficients and generates and transmits coded blocks, until the receiver completely decodes data. At this time, the n coded blocks do not need to be sequentially transmitted, and the coded blocks are independent.

Equation 1 shows an example of a method of generating a coded block set $\overline{E}$ generated by coding an original block set $\overline{S}$.

$$\overline{E} = \overline{H} \times \overline{S} \quad \text{[Equation 1]}$$

In Equation 1, $\overline{H}$ denotes a coefficient matrix, which represents a method of combining the original block set $\overline{S}$. A method of generating the coefficient matrix $\overline{H}$ is as follows.

The coefficient matrix $\overline{H}$ used in the RLC method may be generated by the transmitter or the transmitter and the receiver using a random number in a predetermined range. The random number is obtained by deciding numbers within a predetermined range (e.g., 0 to 255) by the transmitter or the agreement between the transmitter and the receiver and randomly extracting any number from the numbers within the predetermined range. In addition, the coefficient matrix $\overline{H}$ may be generated using a seed value necessary for generating the random coefficient. At this time, the size of the coefficient matrix may be defined by n×n.

$$\text{coded} - blk_j = \sum_{i=1}^{n} c_{ji} \cdot blk_i \quad \text{[Equation 2]}$$

In Equation 2, the coded block may be denoted by coded-$blk_j$ and the coefficient matrix may be denoted by $c_{ji}$. In addition, the original block may be denoted by $blk_i$.

The transmitter may transmit all the n coded blocks of a first coded block set, and the receiver may restore an original block set when all the n coded blocks are received. Thereafter, the transmitter transmits coded blocks included in a second block set so as to perform data communication.

At this time, the size s of each of the coded blocks may be decided by agreement of the transmitter and the receiver when communication is started. Generally, the size of the data block which is decided once is not changed until the communication is completed.

Equation 3 shows a method of calculating a block error rate (or a packet error rate).

$$P_e = 1 - (1 - P_b)^s \quad \text{[Equation 3]}$$

$P_e$: average block error rate
$P_b$: average bit error rate
S: block size

If the size of the block is large, the average block error rate is large, but an average throughput is large. In addition, if the size of the block is small, the average block error rate is small, but the average throughput is small.

The embodiments of the present invention suggest a method of adjusting the size of the data block according to a channel environment unlike a general method. That is, if the embodiments of the present invention are used, it is possible to adjust the size of the block, by increasing or decreasing the size of the block itself or increasing or decreasing the number of blocks transmitted once.

Figure 2:
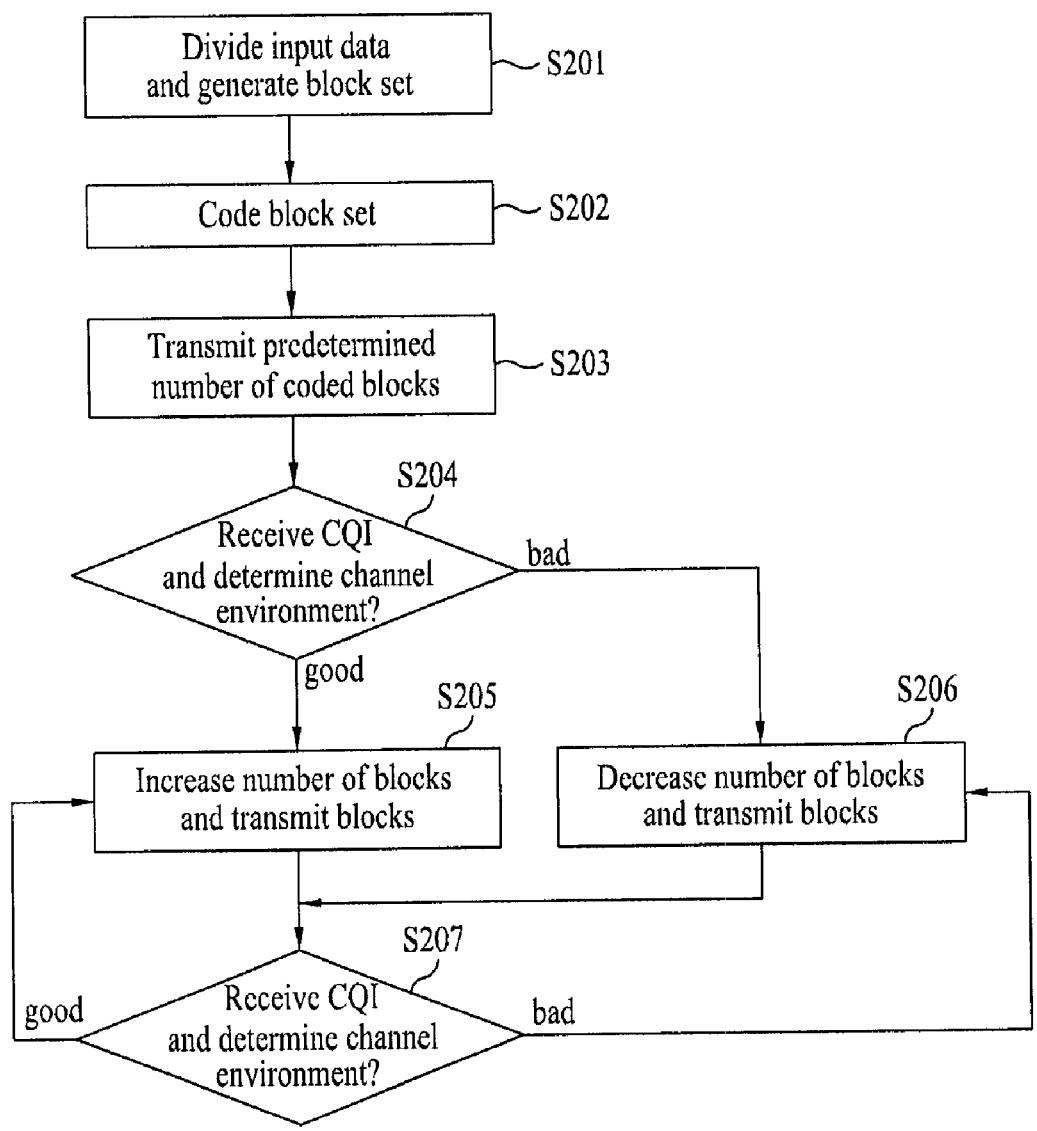
FIG. 2 is a view showing a method of increasing or decreasing the number of blocks transmitted by a transmitter according to a channel environment according to an embodiment of the present invention.

FIG. 2 is a view showing a method of increasing or decreasing the number of blocks transmitted by a transmitter according to a channel environment according to an embodiment of the present invention.

Referring to FIG. 2, the transmitter may divide input data into one or more blocks. The transmitter may select arbitrary number n of blocks from one or more blocks and generate block sets. At this time, the block sets may be formed until all the divided blocks are transmitted (S201).

The transmitter performs coding in the unit of block sets. At this time, if the coding is performed, the RLC method of FIG. 1 may be used. If the coding is performed using the RLC method, a coefficient matrix n×n necessary for coding a first block set and a coefficient matrix necessary for coding a second block set may be identical or different. In addition, the random coefficients used when the coded blocks are coded are preferably mutually independent within one block set (S202).

The transmitter transmits a predetermined number of coded blocks included in the first coded block set to the receiver. At this time, it is assumed that the predetermined number of coded blocks transmitted by the transmitter is "f". "f" is arbitrarily decided and may be changed according to the state of the system or the requirement of a user (S203).

In the step S203, "f" may be less than or greater than n which is the number necessary for coding. The "f" coded blocks may include blocks coded in the same block set and blocks coded in the different block sets. If only a minimum of n coded blocks included in the same block set is transmitted without an error, the receiver can perform decoding.

When the transmitter transmits the "f" coded blocks to the receiver in the step S203, the transmitter may transmit information about a coefficient used in the RLC process of the step S202 together.

For example, the coefficient matrixes may be transmitted together with the coded blocks. In addition, the transmitter may transmit only indexes of the coefficients used in the RLC process of the step S202 to the receiver. When the transmitter transmits only the indexes to the receiver, it is assumed that the transmitter and the receiver may have the same indexes representing random coefficients and a predetermined set of random coefficients. In addition, the transmitter may transmit a seed value, which is used when the random coefficients are generated in the RLC process of the step S202, to the receiver when the first coded block is transmitted.

The reason why the transmitter transmits the information about the coefficients to the receiver is because the receiver decodes the coded blocks generated using the RLC method.

The receiver may measure channel quality and transmit channel quality indication (CQI) information to the transmitter, in the process of receiving the first "f" coded blocks. The transmitter may determine a current channel environment state when receiving the CQI information (S204).

If the transmitter determines that the channel environment is good in the step S204, the number of next coded blocks is increased rather than the number "f" of first coded blocks and next coded blocks are transmitted to the receiver (S205).

If the transmitter determines that the channel environment is bad in the step S204, the number of next coded blocks is decreased rather than the number "f" of first coded blocks and next coded blocks are transmitted to the receiver (S206).

In the step S204, the transmitter may determines that the number of next coded blocks is maintained, without increasing or decreasing the number of next coded blocks according to the channel environment.

After the receiver transmits the information about the channel environment of the "f" coded blocks to the transmitter, the receiver may receive an increased or decreased number of coded blocks from the transmitter, rather than the number "f" of coded blocks. The receiver measures channel quality and transmits CQI information to the transmitter again. The transmitter checks the channel environment and determines whether the number of coded blocks to be transmitted is increased or decreased, after receiving the CQI signal (S207).

The steps S204 to S207 may be repeated until all the n coded blocks, which is necessary for decoding, of all the coded blocks of the coded block set generated by the steps S201 and S202 are transmitted without an error.

By increasing or decreasing the number of code blocks transmitted by the transmitter by the above-described process, it is possible to increase or decrease the size of the transmitted blocks so as to efficiently adapt the channel environment. Alternatively, the transmitter may transmit the coded blocks while maintaining the predetermined number of coded blocks, without increasing or decreasing the number of coded blocks according to the channel environment.

The process described in FIG. 2 may be repeated until the coded blocks included in the first block set are transmitted by the number (n), which is necessary for decoding, without an error. In addition, if the transmission of the first block set is completed, the second coded block set is transmitted. Such a process may be repeated until all input data is transmitted.

In the following embodiments, in order to efficiently describe the present invention, the coded data block is called a coded block, and the coded block set is called a segment.

Figure 3:
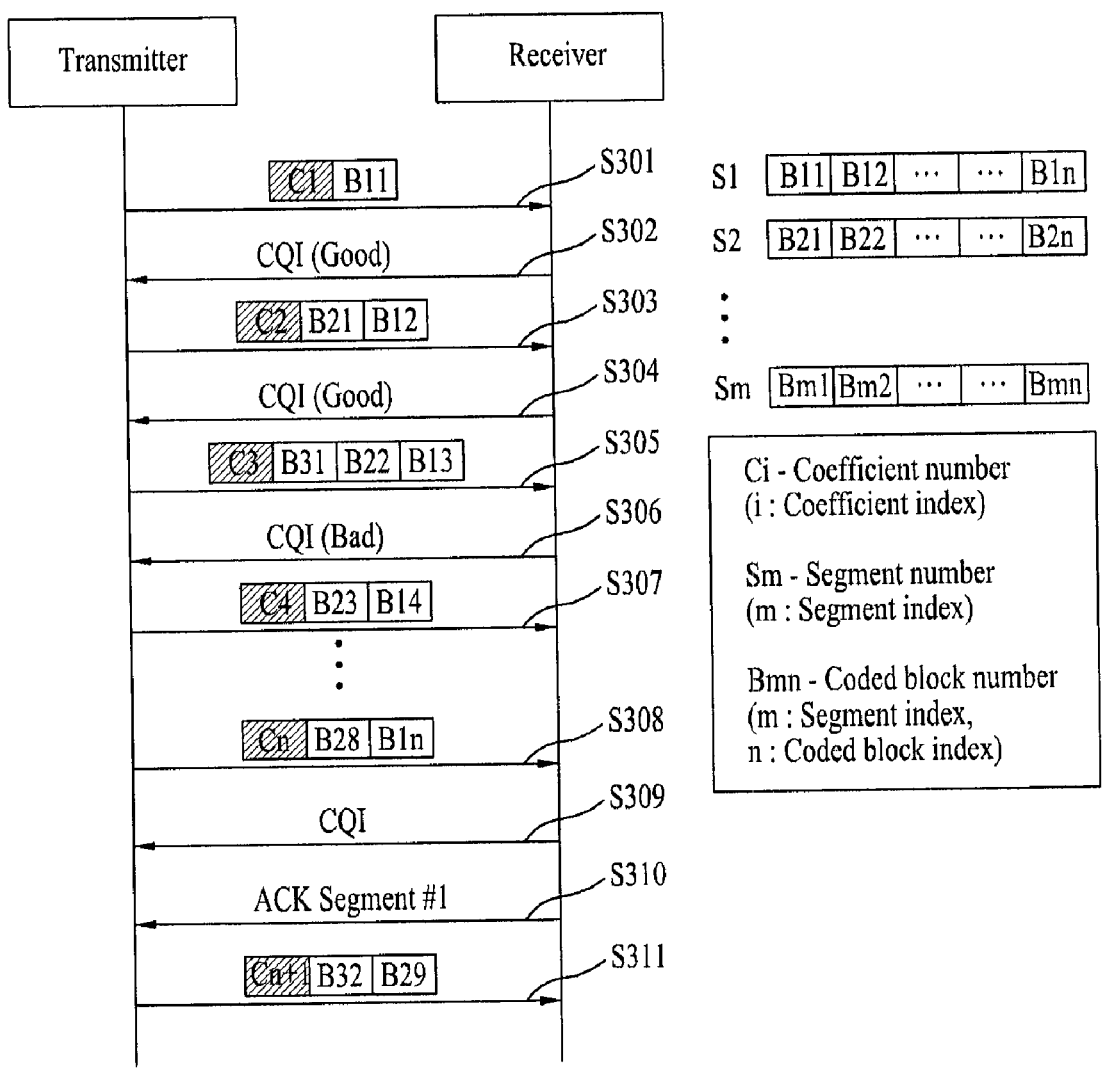
FIG. 3 is a view showing a method of increasing or decreasing the size of a code block by borrowing the code block at a transmitter according to an embodiment of the present invention.

FIG. 3 is a view showing a method of increasing or decreasing the size of a code block by borrowing the code block at a transmitter according to an embodiment of the present invention.

In a radio communication network, a CQI signal may be used for reporting the state of a radio channel. A receiver may report the state of a channel to the transmitter using the CQI signal. The transmitter may perform an adaptive modulation & coding (AMC) scheme using the CQI signal. That is, the transmitter may use the CQI signal for deciding the size of the block in a communication system using the RLC method.

The method which is applied in the embodiment of the present invention may vary according to the amount of channel information which can be delivered by the CQI signal.

In the embodiment of the present invention, it is assumed that information which can be delivered by the CQI signal has 1 bit and indicates whether the state of a current channel is good or bad. At this time, the transmitter may vary the transmission size of the coded blocks by increasing or decreasing the number of coded blocks one by one when the CQI signal is received.

If the amount of channel information which can be delivered by the CQI signal is large, the number of coded blocks which can be transmitted by the transmitter may be explicitly informed. In this case, the transmitter may pack the coded blocks by the informed number and transmit the coded blocks to the receiver. At this time, the packing may indicate all actions for packing, combining or connecting one or more blocks.

In FIG. 3, "Ci" denotes a random coefficient number and "i" denotes a random coefficient index. In addition, "Sm" denotes a segment number (or a coded block set number) and "m" denotes a segment index. In addition, "Bmn" denotes a coded block, "m" denotes a segment index number, and "n" denotes a coded block index.

Referring to FIG. 3, the transmitter may perform block borrowing in a state in which the size of the coded blocks is previously decided. The transmitter packs a coded block B11 included in a first segment (a first coded block set) and transmits the coded block B11 to the receiver. At this time, a random coefficient C1 used for performing the RLC of the first segment S1 may be transmitted to the receiver together (S301).

The receiver measures channel quality of the transmission of the step S301 and transmits the CQI signal to the transmitter. At this time, in the embodiment of the present invention, it is assumed that the channel quality is good. Accordingly, the receiver transmits the CQI signal (good) to the transmitter (S302).

When the transmitter receives the CQI signal (good), the transmitter determines that the channel environment is good, and decides to increase the size of the blocks to be transmitted and to transmit the block. Accordingly, the transmitter may increase the number of coded blocks to be more than the number of coded blocks transmitted in the step S301 by one and transmit the coded blocks (S303).

In the step S303, the transmitter may generate a coded block B21 in a second segment S2 using a random coefficient C2 used for performing the RLC of the first segment S1. The transmitter may borrow the coded block B21 from the second segment S2. In addition, the transmitter should inform the receiver of the segment number of the coded blocks and/or the random coefficient used for coding them.

At this time, since the random coefficients used when the coded blocks are generated are mutually independent, the transmitter should explicitly inform the receiver of the random coefficients. Accordingly, the transmitter may directly inform the receiver of the random coefficients, inform the receiver of a random seed used when the random coefficients are generated, or inform the receiver of the random coefficients by generating the random coefficients in advance and transmitting indexes indicating the used coefficients.

In the embodiments of the present invention, for example, the case where the transmitter directly transmits the random coefficients to the receiver will be described. The method of transmitting the random seed or the indexes of the coefficients may be also applied.

The transmitter may receive the CQI signal (good) from the receiver (S304).

The transmitter which receives the CQI signal (good) may determine that the channel environment is good, increase the number of coded blocks to be more than the number of coded blocks transmitted in the step S303 by one, and transmit the coded blocks to the receiver. The transmitter may borrow the coded block from another segment instead of the first segment S1 like the step S303. In the embodiment of the present invention, it is assumed that the coded block is borrowed from the second segment S2 and a third segment S3 one by one. Accordingly, the transmitter may transmit a coded block B13 included in the first segment and borrowed coded blocks B22 and B32 to the receiver (S305).

In the step S305, the transmitter may transmit a random coefficient C3 used for coding the coded blocks to the receiver together with the coded blocks. In addition, the borrowed segment may be arbitrarily decided. The same random coefficient should be used in every borrowed segment.

While wired or wireless communication is performed, a channel state may become bad. In this case, the receiver transmits the CQI signal (bad) to the transmitter (S306).

When the transmitter receives the CQI signal (bad) from the receiver, the transmitter may determine that the channel state becomes bad and decode to decrease the size of the block to be transmitted. At this time, how many the number of coded blocks transmitted by the transmitter is decreased by may vary according to information included in the CQI signal. If it is informed that the channel environment is good or bad using the CQI signal, only one coded block may be decreased. If the CQI signal may include information of 1 bit or more, a plurality of coded blocks can be decreased.

Accordingly, the transmitter transmits coded blocks B23 and B14 of the number less than the number of coded blocks transmitted in the step S305 by one to the receiver. When the coded blocks B23 and B14 are subjected to the RLC, the same random coefficient C4 may be used, and the transmitter may transmit the random coefficient to the receiver together (S307).

By repeating the above-described processes, the transmitter may transmit all the coded blocks included in the first segment S1 to the receiver. That is, the transmitter transmits a last coded block B1$n$ included in the first segment S1 and a coded block B28 borrowed from the second segment S2 to the receiver, thereby completing the transmission of the first segment S1 (S308).

The receiver may measure the channel environment in the process of receiving the coded blocks in the step S308. Accordingly, the receiver includes information about the measured channel environment in the CQI signal and transmits the CQI signal to the transmitter (S309).

On the basis of the CQI signal transmitted in the step S309, the transmitter may decide the number of coded blocks to be transmitted when the second segment S2 is transmitted.

In addition, in the embodiment of the present invention, when the receiver normally receives all the coded blocks included in the first segment S1, decoding is successfully performed. Accordingly, the receiver transmits an acknowledgement (ACK) message for the first segment S1 to the transmitter so as to inform the transmitter that the decoding is successfully performed (S310).

The transmitter which receives the ACK message may recognize that the decoding of the first segment S1 is successfully performed by the receiver and transmit the coded blocks included in the second segment S2 to the transmitter. At this time, only the residual coded blocks of the second segment except for the coded blocks which are borrowed when the first segment is transmitted may be transmitted to the receiver.

For example, it is assumed that one segment includes 10 coded blocks. In FIG. 3, since eight coded blocks of the second segment S2 are transmitted in the process of transmitting the first segment S1, the transmitter transmits only two coded blocks B29 and B210 to the receiver. Accordingly, the transmitter transmits the coded block B29 included in the second segment S2 and a coded block B32 borrowed from the third segment to the receiver (S311).

The above-described processes are repeated until an m$^{th}$ segment Sm is all transmitted.

Figure 4:
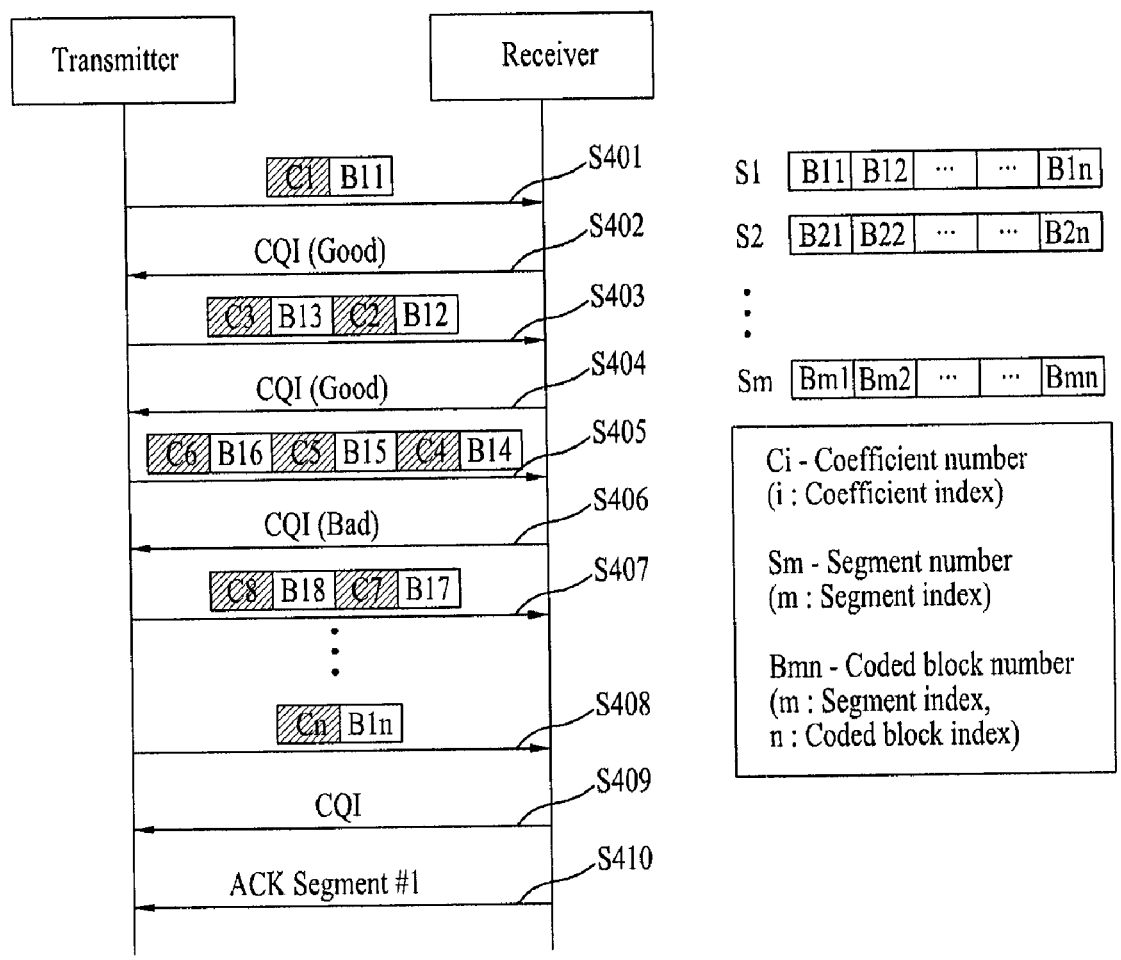
FIG. 4 is a view showing a method of adaptively packing code blocks according to an embodiment of the present invention.

FIG. 4 is a view showing a method of adaptively packing code blocks according to an embodiment of the present invention.

In FIG. 4, "Ci" denotes a random coefficient number and "i" denotes a random coefficient index. In addition, "Sm" denotes a segment number (or a coded block set number) and "m" denotes a segment index. In addition, "Bmn" denotes a coded block number. At this time, "m" denotes a segment index, and "n" denotes a coded block index.

Referring to FIG. 4, a receiver may report a channel state to a transmitter using a CQI signal. The transmitter may adjust the size of the blocks to be transmitted to the receiver by increasing or decreasing the number of coded blocks, which are currently transmitted, according to the channel state.

The transmitter may divide data to be transmitted into blocks having a predetermined size, code the blocks, and transmit the coded blocks. At the time, coding may be performed using the RLC method. Generally, the transmitter may decide the size of coded blocks to be small. Accordingly, the transmitter can efficiently cope with a channel error by increasing or decreasing the number of coded blocks, which are packed and transmitted, according to the channel state.

At this time, the method of FIG. 4 is different from the method of FIG. 3 in that, since the coded blocks included in the same segment (or the same coded block set) are packed and transmitted, the random coefficients used for coding the coded blocks are mutually independent and different.

Referring to FIG. 4, the transmitter divides data to be transmitted into one or more blocks and code the blocks using the RLC method. In addition, the transmitter may configure a segment by packing n coded blocks.

The transmitter may pack only one first coded block B11 included in a first segment S1 and transmit the first coded block to the receiver. At this time, the transmitter may transmit a random coefficient C1 used for coding the first coded block B11 to the receiver together (S401).

The receiver measures the quality of a channel, via which the coded block is transmitted, and transmits a CQI signal to the transmitter. At this time, in the embodiment of the present invention, it is assumed that the channel quality is good. Accordingly, the receiver transmits the CQI signal (good) to the transmitter (S402).

When the transmitter receives the CQI signal (good) from the receiver, the transmitter determines that the channel environment is good. Accordingly, the transmitter may increase the number of coded blocks to be transmitted to the receiver by one and transmit the coded blocks. Accordingly, the transmitter may pack coded blocks B12 and B13 and transmit the coded block B12 and B13 (S403).

In the step S403, since random coefficients C2 and C3 used for generating the coded blocks B12 and B13 are mutually independent, the transmitter should explicitly inform the receiver of the random coefficients. Accordingly, the transmitter may directly inform the receiver of the random coefficients, inform the receiver of a random seed used when the random coefficients are generated, or inform the receiver of the random coefficients by generating the random coefficients in advance and transmitting indexes indicating the used coefficients.

In the embodiments of the present invention, for example, the case where the transmitter directly transmits the random coefficients to the receiver will be described. The method of transmitting the random seed or the indexes of the coefficients may be also applied.

The number of coded blocks which are packed and transmitted in the step S403 may vary according to the amount of information delivered by the CQI signal. For example, if the CQI signal has 1 bit and indicates that the channel environment is only good or bad, the number of coded blocks may be increased or decreased one by one. If the CQI signal can represent information using one or more bits, the receiver may inform the transmitter of the number of coded blocks which can be transmitted. In this case, the transmitter may pack the coded blocks by the number recognized by the CQI signal and transmit the coded blocks.

By increasing the number of coded blocks in the step S403, the whole size of the transmitted blocks can be increased. At this time, since the channel environment is good although the size of the blocks is increased, a probability that an error occurs is reduced. Since the size of the transmitted blocks is increased, a data throughput can be increased.

The receiver measures the quality of a channel of the coded blocks transmitted in the step S403 and transmits a CQI signal to the transmitter. At this time, the receiver may report the channel quality state to the transmitter using the CQI signal (good) (S404).

When the transmitter receives the CQI signal (good), the transmitter may determine that the channel environment in which the current coded block is transmitted is good, increase the number of coded blocks one by one, and transmit the coded blocks. For example, the transmitter may pack coded blocks B14, B15 and B16 and transmit the coded blocks to the receiver. At this time, since random coefficients C4, C5 and C6 used for generating the coded blocks are mutually independent and different, the transmitter should inform the receiver of the random coefficients. Accordingly, the transmitter may pack the coded blocks and the random coefficients together and transmit the coded blocks and the random coefficients to the receiver (S405).

The channel environment may become bad in the process of transmitting or receiving the data blocks. The receiver measures the channel state and informs the transmitter that the channel environment becomes bad if the channel environment becomes bad. Accordingly, the receiver may inform the transmitter that the current channel state is bad using the CQI signal (bad) (S406).

The transmitter which receives the CQI signal (bad) from the receiver determines that the current channel environment becomes bad and decides to decrease the size of the blocks transmitted to the receiver in order to suppress a channel error. Accordingly, the transmitter may transmit coded blocks of the number less than the number of coded blocks transmitted in the previous step (e.g., the step S405) by one to the receiver. That is, the transmitter packs two coded blocks B17 and B18 and transmits the two coded blocks to the receiver. At this time, random coefficients C7 and C8 used for coding the coded blocks may be packed and transmitted (S407).

In the step S407, the transmitter decreases the number of packed coded blocks, thereby decreasing the size of the blocks transmitted to the receiver. Accordingly, although a data throughput is decreased, a channel error can be suppressed.

The transmitter and the receiver may repeat the above-described process until the whole first segment Si is transmitted. Accordingly, if n coded blocks configure one segment, the transmitter packs a last coded block B1n and a random coefficient Cn used for coding the last coded block and transmits the last coded block and the random coefficient to the receiver (S408).

The receiver measures the channel state for the transmission of the coded blocks in the step S408 and transmits a CQI signal to the transmitter. That is, the receiver may transmit the CQI signal to the transmitter (S409).

In the step S409, the CQI signal may be used for determining how many coded blocks are first packed and transmitted when the coded blocks included in the next second segment S2 are transmitted.

The receiver transmits an ACK message for the first segment S1 to the transmitter if all the n coded blocks are normally received from the transmitter and decoding is successfully performed (S410).

When the transmitter receives the ACK message, the transmitter may determine that the first segment S1 is successfully transmitted and transmit the coded blocks included in the next segment S2 to the receiver. This process may be repeated until all the coded blocks included in an $m^{th}$ segment Sm are transmitted.

Figure 5:
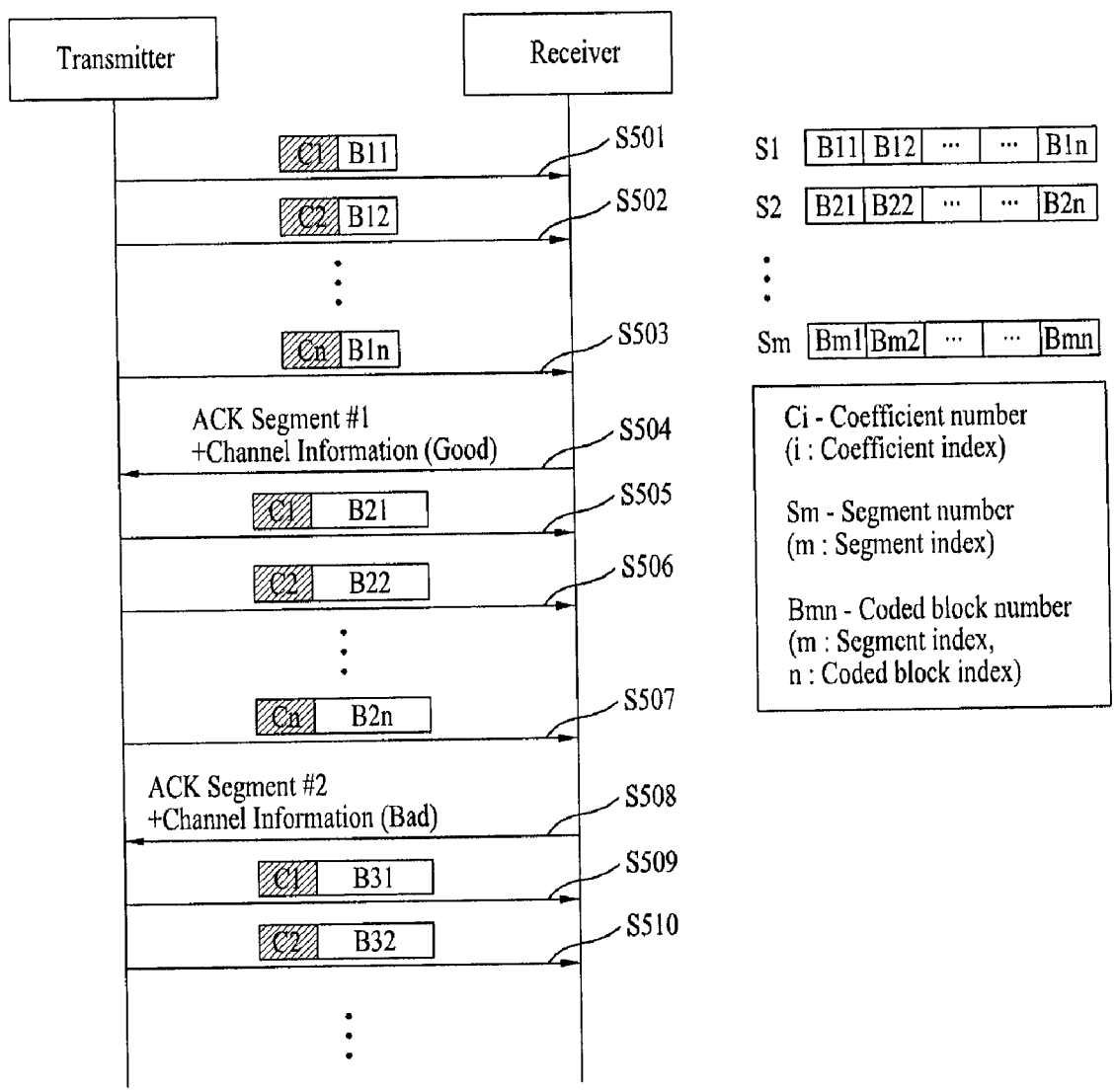
FIG. 5 is a view showing a method of adaptively increasing or decreasing the size of transmitted blocks according to a channel environment according to another embodiment of the present invention.

FIG. 5 is a view showing a method of adaptively increasing or decreasing the size of transmitted blocks according to a channel environment according to another embodiment of the present invention.

In FIG. 5, "Ci" denotes a random coefficient number and "i" denotes a random coefficient index. In addition, "Sm" denotes a segment number (or a coded block set number) and "m" denotes a segment index. In addition, "Bmn" denotes a coded block number. At this time, "m" denotes a segment index, and "n" denotes a coded block index.

Referring to FIG. 5, a receiver may transmit an ACK message including channel information while the segment is received to a transmitter after all n coded blocks included in one segment are received. The transmitter which receives the ACK message may decide the size of the coded blocks included in a next segment in consideration of the channel environment.

That is, the transmitter increases the size of the coded blocks included in the next segment to be more than the size of the coded blocks included in the previous segment if it is determined that the channel environment is good, and decreases the size of the coded blocks included in the next segment to be less than the size of the coded blocks included in the previous segment if it is determined that the channel environment is bad.

Referring to FIG. 5, the transmitter divides data to be transmitted into small blocks and packs the divided small blocks by any number (n) so as to form a segment (or a block set). The transmitter may perform the RLC described in FIG. 1 in the unit of segments and generate n coded blocks.

The size of coded blocks included in a first segment S1 is decided according to a current channel state and the size is equally applied to the coded blocks of the first segment S1. Accordingly, the transmitter transmits a first coded block B11 to an $n^{th}$ coded block B1n to the receiver. At this time, random coefficients used for coding the coded blocks may be transmitted to the receiver together (S501 to S503).

In the embodiments of the present invention, since the coded blocks are coded using the RLC method, the receiver may decode the first segment S1 if the n coded blocks corresponding to the first segment S1 are present regardless of the sequence of coded blocks. Accordingly, the receiver may successfully perform decoding when n independent RLC coefficients (random coefficients) used for coding the first segment S1 by the transmitter are received. In addition, if the receiver knows about the random coefficients used by the transmitter in advance, the receiver may perform decoding even when only the indexes for the random coefficients are received from the transmitter.

If the decoding is successfully performed, the receiver transmits an ACK message for the first segment S1 to the transmitter. At this time, the receiver may transmit channel information to the transmitter while the coded blocks included in the first segment S1 are received. In the embodiment of the present invention, in this case, it is assumed that the receiver reports that the channel environment is good (S504).

In the step S504, the channel information (CI) may represent a variety of information according to the number of bits allowed for representing the information. In the embodiment of the invention, it is assumed that the channel information has 1 bit and indicates whether the channel environment is good or bad. However, if several bits can be used, the size of the coded blocks may be explicitly informed. This may vary according to the requirement of the user.

In the step S504, if several bits can be used in the channel information, the channel information may include information about a feedback type of the first segment S1.

Table 1 shows an example of a block error rate according to the feedback type.

TABLE 1

| Feedback type | Block error rate |
|---|---|
| 1 | <5% |
| 2 | <10% & >5% |
| 3 | <20% & >10% |
| 4 | <40% & >20% |
| 5 | <90% & >40% |
| 6 | >90% |

Table 2 shows a variation in size of coded blocks which is increased or decreased according to the feedback type.

TABLE 2

| Feedback type | Block size |
|---|---|
| 1 | +75 bytes |
| 2 | +50 bytes |
| 3 | −25 bytes |
| 4 | −50 bytes |
| 5 | −75 bytes |
| 6 | +100 bytes |

Referring to Tables 1 and 2, for example, the case where the feedback type included in the channel information is 2 will be described. If the feedback type is 2, it is indicated that the block error rate is greater than 5% and less than 10% (<10% & >5%). In this case, since the channel environment is good, it is indicated that the length of the coded blocks is increased by +50 bytes.

If the feedback type included in the channel information is 5, it is indicated that the block error rate is greater than 40% and less than 90% (<90% & >40%). At this time, since the channel environment is bad, it is indicated that the length of the coded blocks is decreased by −70 bytes.

Referring to FIG. 5 again, the transmitter may vary the length of the coded blocks included in the second segment S2 according to the channel information received in the step S504. That is, since the channel information that the channel environment is good is received, the transmitter may increase the size of the coded blocks (B12, B22, . . . , and B2$n$) of the second segment S2 to be more than the size of the coded blocks of the first segment S1 and transmits the coded blocks (S505 to S507).

The receiver may perform decoding when all the n coded blocks included in the second segment S2 and the random coefficients corresponding thereto are received. If all the n coded blocks are received and the decoding is successfully received even in the state in which the channel environment is bad, the receiver may transmit an ACK message to the transmitter. The receiver includes the information that the channel environment is bad in the channel information and transmits the information to the transmitter (S508).

The transmitter which receives the channel information (bad) from the receiver together with the ACK message may recognize that the channel environment is bad. Accordingly, although a data throughput is decreased, for reliable data transmission, it is decided that the size of the coded blocks is decreased and the coded blocks are transmitted. That is, the transmitter may decrease the size of the coded blocks included in a third segment S3 and transmit the coded blocks to the receiver by referring to Tables 1 and 2 (S509 to S510).

The above-described process may be repeated until all the coded blocks included in an $m^{th}$ segment Sm are transmitted.

If the methods described in FIGS. 2 to 5 are used, the size of coded blocks is properly adjusted according to the channel environment and the coded blocks are transmitted. Accordingly, it is possible to perform reliable data transmission and efficient communication.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. In addition, embodiments may be configured by combining claims which do not have an explicit citation relationship therebetween or new claims may be added by an amendment after the application.

INDUSTRIAL APPLICABILITY

The embodiments of the present invention are applicable to various radio access systems. Examples of various radio access systems include the $3^{rd}$ generation partnership project (3GPP), the 3GPP2 and/or the institute of electrical and electronic engineers 802 (IEEE 802.xx). The embodiments of the present invention are applicable to all technical fields using the various radio access systems as well as the various radio access systems.

The invention claimed is:

1. A method of transmitting data in a radio access system, the method comprising:
generating one or more block sets using a plurality of blocks, wherein the plurality of blocks are divided from an input data;
coding a first block set of the one or more block sets to produce a first coded block set;
transmitting a predetermined number of coded blocks in the first coded block set to a receiver;
receiving a signal indicating a state of a channel environment from the receiver; and
packing an increased or decreased number of coded blocks, as compared to the predetermined number of coded blocks, according to the signal and transmitting the packed coded blocks to the receiver,
wherein, if the signal indicates that the channel environment is better than a predetermined threshold, a second block set of the one or more block sets is coded to produce a second coded block set, a coded block is borrowed from the second coded block set, and the increased number of coded blocks are packed and transmitted to the receiver, and wherein random coefficients used for coding the first block set and the second block set are identical to each other.

2. The method according to claim 1, wherein, if the signal indicates that the channel environment is worse than the predetermined threshold, the decreased number of coded blocks are packed and transmitted to the receiver.

3. The method according to claim 1, wherein the increased or decreased number of coded blocks are increased or decreased from the predetermined number of coded blocks one by one.

4. The method according to claim 1, wherein one or more coded block sets are generated by coding the one or more block sets by a transmitter, and coded blocks included in the one or more coded block sets are mutually independent.

5. The method according to claim 1, wherein a random linear coding (RLC) method is used as a method of coding the one or more block sets.

6. The method according to claim 1, wherein the signal for indicating the state of the channel environment is a channel quality indication (CQI) signal.

7. The method according to claim 1, wherein the predetermined number of coded blocks further includes information about the random coefficients.

8. The method according to claim 7, wherein the information about the random coefficients is one of a matrix configured by the random coefficients, a seed for generating the random coefficients or indexes indicating the random coefficients.

9. A method of transmitting data in a radio access system, the method comprising:

generating one or more block sets using a plurality of blocks, wherein the plurality of blocks are divided from an input data;

coding a first block set of the one or more block sets to produce a second coded block set;

transmitting a predetermined number of coded blocks in the first coded block set to a receiver;

receiving a signal indicating a state of a channel environment from the receiver; and packing an increased or decreased number of coded blocks, as compared to the predetermined number of coded blocks, according to the signal and transmitting the packed coded blocks to the receiver, wherein, if the signal indicates that the channel environment is better than a predetermined threshold, the increased number of coded blocks are selected from the first coded block set and are packed and transmitted, and wherein a random coefficient used for coding the increased number of coded blocks is mutually independent from a random coefficient used for coding the predetermined number of coded blocks.

10. A device configured to transmit data in a radio access system, the device comprising:

a processor configured to generate one or more block sets using a plurality of blocks, wherein the plurality of blocks are divided from an input data, code a first block set of the one or more block sets to produce a first coded block set, transmit a predetermined number of coded blocks in the first coded block set to a receiver, receive a signal indicating a state of a channel environment from the receiver, and pack an increased or decreased number of coded blocks, as compared to the predetermined number of coded blocks, according to the signal and transmit the packed coded blocks to the receiver, wherein, if the signal indicates that the channel environment is better than a predetermined threshold, a second block set of the one or more block sets is coded to produce a second coded block set, a coded block is borrowed from the second coded block set, and the increased number of coded blocks are packed and transmitted to the receiver, and wherein random coefficients used for coding the first block set and the second block set are identical to each other.

* * * * *